United States Patent
Suing et al.

(10) Patent No.: US 7,486,390 B2
(45) Date of Patent: Feb. 3, 2009

(54) DEVICE AND PROCESS FOR ALIGNMENT OF MACHINES, MACHINE PARTS OR OTHER TECHNICAL ARTICLES

(75) Inventors: Harald Suing, Fuerstenfeldbruck (DE); Martin Wegener, Kirchheim (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 379 days.

(21) Appl. No.: 11/367,702

(22) Filed: Mar. 6, 2006

(65) Prior Publication Data

US 2006/0196060 A1 Sep. 7, 2006

(30) Foreign Application Priority Data

Mar. 4, 2005 (DE) .................. 10 2005 010 527

(51) Int. Cl.
*G01B 11/26* (2006.01)
(52) U.S. Cl. .................. 356/153; 356/139.1
(58) Field of Classification Search ............. 356/153, 356/139.1, 141.2, 141.3, 152.1, 152.3; 33/286, 33/228
See application file for complete search history.

(56) References Cited

U.S. PATENT DOCUMENTS

| | | | |
|---|---|---|---|
| 4,243,877 A * | 1/1981 | Cruz | 250/206.2 |
| 4,709,485 A * | 12/1987 | Bowman | 33/228 |
| 6,040,903 A | 3/2000 | Lysen et al. | |
| 6,046,799 A | 4/2000 | Lysen | |
| 6,223,102 B1 * | 4/2001 | Busch | 700/279 |
| 6,434,849 B1 * | 8/2002 | Hermann | 33/529 |
| 6,515,294 B1 | 2/2003 | Busch et al. | |
| 6,609,305 B2 | 8/2003 | Lysen | |
| 7,312,864 B2 * | 12/2007 | Lysen | 356/153 |
| 2005/0237516 A1 | 10/2005 | Lysen | |

* cited by examiner

*Primary Examiner*—L. G Lauchman
(74) *Attorney, Agent, or Firm*—David S. Safran; Roberts Mlotkowski Safran & Cole, P.C.

(57) ABSTRACT

The process as claimed in the invention for alignment of machines, machine elements or the like, especially of pipes or hollow cylinders is carried out by means of the pertinent devices such that in one of two measurement phases with the light transmitting and receiving device (20) fixed, rotation of the reflector prism (60) takes place in at least 3 optionally selectable rotary positions together with the pertinent data acquisition, and in the other of the two measurement phases with the reflector prism (60) fixed, rotation of the light transmitting and receiving device (20) takes place in either 2 predefined rotary locations at a right angle to one another, or 3 or more optionally selectable rotary positions together with the pertinent data acquisition.

12 Claims, 3 Drawing Sheets

DEVICE AND PROCESS FOR ALIGNMENT OF MACHINES, MACHINE PARTS OR OTHER TECHNICAL ARTICLES

BACKGROUND OF THE INVENTION

1. Field of the Invention

This invention relates to a device and a process for alignment of machines, machine parts or other technical articles by means of light beams and optoelectronic receiving elements.

2. Description of Related Art

Devices and processes of this type have been used with great success for roughly 20 years in order to execute convenient and nevertheless very precise alignment of machines or other technical articles.

SUMMARY OF THE INVENTION

The object of the invention is to develop the aforementioned devices and processes so that, especially, the diversity of possible applications can be increased without higher added costs. In this respect, it is a special topic of the invention to devise a means for improved alignment of pipes and hollow cylinders relative to one another. However, the invention can also be used especially to align spindles in the axial direction relative to one another, i.e., to set the axial offset in the radial direction (therefore, translationally or parallel offset) and/or the angular offset (therefore, for example, offset in the direction of azimuth or elevation) to values as small as possible.

This object is achieved, in accordance with the invention, in that a light transmitting/receiving means, which is known in principle, is attached or fixed coaxially to a pipe or spindle. In accordance with the invention, there is a 90° prism (occasionally also called a roof edge prism) which acts as a reflector opposite, in the direction of the transmitted light beam. This prism is called a reflector prism below. This combination is known in the art for purposes of spindle alignment and is available from Pruftechnik Dieter Busch AG under the trademark SPINDALIGN®. However, to align spindles according to the Spindalign device, it is necessary to turn both the light transmitting/receiving means and also the reflector prism in the same direction of rotation at the same time. This is not optimally ergonomic. It is apparent that the use of this measurement principle for alignment of pipes is accompanied by even poorer ergonomy. This problem is solved as according to the invention by the surprisingly simply measure of only pivoting the other part of the measurement apparatus, i.e., the reflector prism by an angle of rotation, specifically around an axis of rotation which is parallel to the pipe to be aligned, with the light transmitting/receiving means being stationary. In different positions of rotation of the reflector prism, then, the respective incidence point of the reflected laser beam is measured by the light transmitting/receiving means by means of an optoelectronic detector which can be read out two dimensionally. The reflector prism can be pivoted within the pipe by means of a rotation device, or can be fixed on the pipe and pivoted together with it by a defined angle ("φ"), preferably, 90°. At least two positions of rotation of the reflector prism can be used, it being advantageous to determine its respective position of rotation (=rotary location) by means of an inclinometer, especially by means of an electronically acting inclinometer. Surprisingly, the light spot of the light beam or laser beam reflected per reflector prism migrates on the optoelectronic device such that when the reflector prism is rotated by only 90°, a circular curve or elliptical locus diagram with an arc corresponding to 180° is formed, generally, therefore a doubling of the angle of rotation is caused. For this reason, the evaluating software of a device in accordance with the invention must specially take this effect into account so that existing conventional devices are matched simply in terms of software, but cannot be used unmodified.

The invention therefore calls for the following, aside from the equivalents:

A device for alignment of machines or objects, having a selectively fixable light transmitting and receiving device or one which can be rotated around its lengthwise axis, with which a first reference axis is defined, and having an optical element which can be rotated around a second reference axis and which is made as a reflector prism or is equivalent to one, and/or a process for alignment of machines or objects in which a device of the aforementioned type is used to determine the position of the indicated first reference axis relative to the location of the indicated second reference axis according to two angular coordinates of space and according to two coordinates of the parallel offset; and/or a process for alignment of machines, machine elements or the like, especially of pipes or hollow cylinders, which in one of two measurement phases, with the light transmitting and receiving device fixed, provides for rotation of the reflector prism in at least 3 optionally selectable rotary positions together with the pertinent data acquisition, and in the other of the two measurement phases, with the reflector prism fixed, rotation of the light transmitting and receiving device in exactly 2 especially predefined, but preferably more than 2, and then, optionally selectable rotary positions together with the pertinent data acquisition; and/or the use of one or more of the aforementioned processes or of the aforementioned device in order to align machines, machine elements or other technical and architectonic objects relative to one another, and preferably to align them in a flush manner.

DETAILED DESCRIPTION OF THE INVENTION

Figure 1:
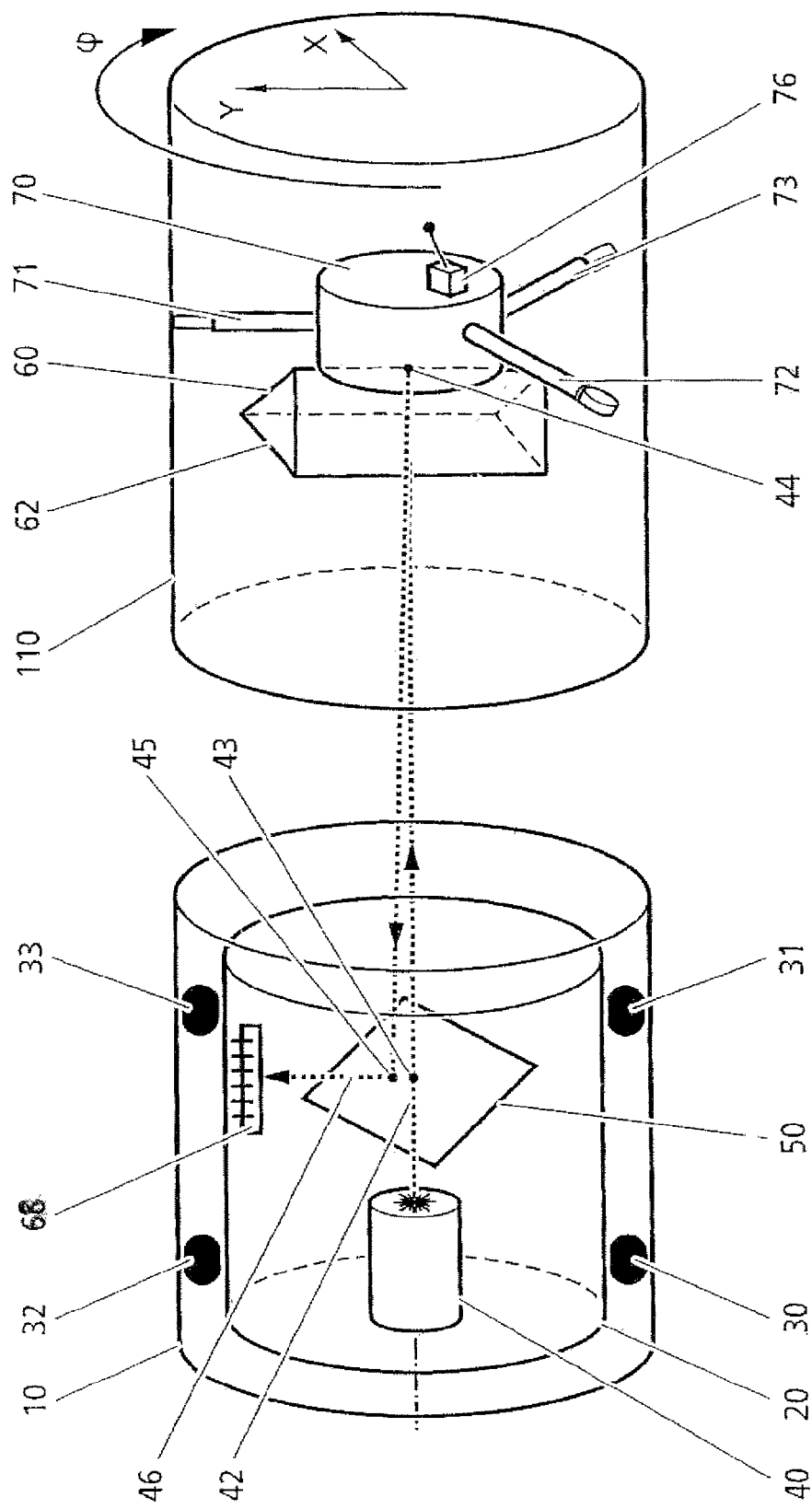
FIG. 1 is a diagrammatic perspective view of an apparatus in accordance with the present invention.

A pipe or machine part 10 which is to be aligned points at a comparable part 110 relative to which it is to be aligned. The housing 20 of the light transmitting/receiving device is rigidly attached coaxially within the pipe by means of spacing devices 30-33. Within the housing 20 is a light transmitter 40 of a type which is known in the art and to which preferably a semitransparent divider mirror 50 is connected upstream. A 90° prism (also called a roof edge prism) is located within the pipe 110 and acts as a reflector directed in a direction opposite the direction of the transmitted light beam (represented by dotted lines in FIG. 1).

In this way, an emitted light beam 42 is only partially transmitted (intercept point 43). This light beam is reflected by the reflector prism 60 which is located within the pipe 10 on its leg surfaces in a manner known in the art. In a favorable case, the light beam 42 is incident on the "roof edge" of the reflector prism, for example, on the reflection point 44. The front surface 62 of the reflector prism can be optically coated. The light beam 46 then reaches the optoelectronic sensor 68 which can be read out in two axes, after it has been proportionally deflected roughly at a right angle at the reflection point 45 (preferably 50% of the incident intensity) by the partially transparent mirror acting as a beam splitter 50.

If the reflector prism is not directly pivoted with the pipe 10 (or a comparable spindle) around the lengthwise axis of the pipe, there can be a holding device 70 together with a spacing and pivoting means 71-73, with which the reflector prism 60 can be turned. To do this, advantageously, there can be an electric motor drive. For precise determination of the rotational position, it is advantageous to use an electrical or electronic inclinometer 76, although, this is not absolutely necessary, depending on the accuracy requirement. To illustrate the geometrical relationships in FIG. 1, the direction of the x and y axis is indicated, and the z axis extends in the direction of the lengthwise axis of the pipe or article 110.

Figure 2:
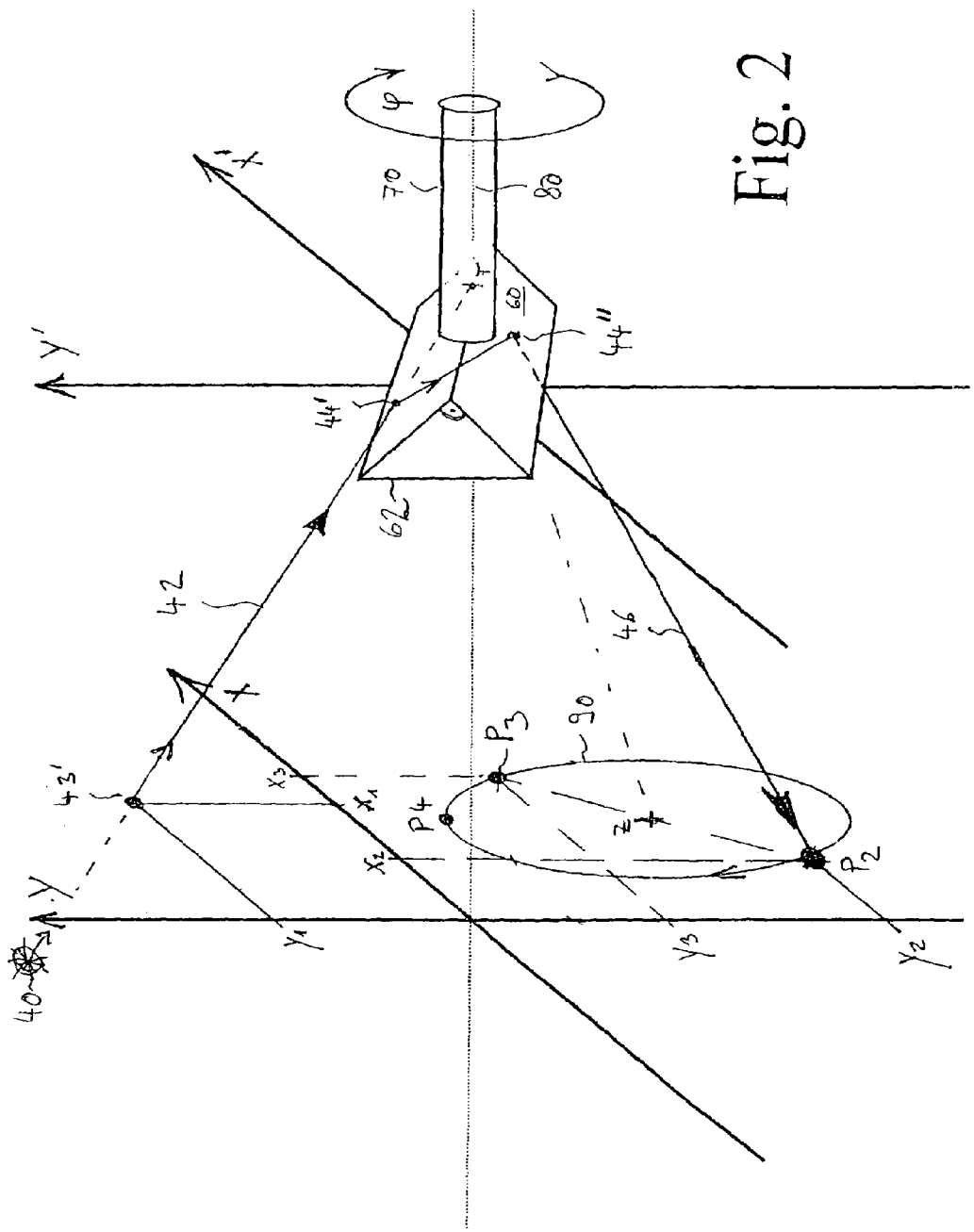
FIG. 2 is diagram illustrating the principle of the measurement process in accordance with the present invention.

The underlying principle of the measurement process is shown in FIG. 2. For reasons of clarity, a schematic is used in which the beam splitter 50 is omitted. Rather the measurement plane of the sensor 60 may be located on the x-y plane of FIG. 2. A light beam 42 emitted by the light transmitter 40 may intersect this plane at a point 43' which has coordinates $x_1$, $y_1$. In most cases, such a beam is not incident on a point "T" which lies on the axis 80, but is deflected so as to be skewed relative to this axis. Depending on the beam location and the rotational position of the prism 60, doubled deflection of the beam occurs at different reflection points, for example, at the illustrated points 44' and 44". A beam which has been deflected in this way is labeled with reference number 46 and strikes the x-y plane at point $P_2$ having coordinates $x_2$, $y_2$. After rotation of the prism 60 by the angle of rotation $\phi$ which is equal to 90°, the beam 46 reaches the x-y plane or an equivalent sensor plane at point $P_3$ having the coordinates $x_2$, $y_2$ which span the diameter of the pertinent circle. Accordingly, the center Z of this circle has the coordinates $(x3+x2)/2$ and $(y3+y2)/2$.

Using the 4 coordinates for points $P_2$ and $P_3$ it is possible, based on known mathematical relationships, to determine both the axial angle difference between the incident beam 42 and axis 80 according to two spatial coordinates, as well as the parallel offset, i.e., the distance of these lines in the x'-y' plane which is assigned to the front surface 62, as the pertinent measurement task requires.

In another configuration of the invention, it is possible, instead of a pivoting motion of 90°, to carry out several others with optional angles. It is preferred, in this case, to determine the rotary location of the reflector prism 60 as an angular value at the same time per inclinometer 76 and to supply it to the required downstream computing operation. The radius and center of the circle 90 can be determined in principle by three points of the type $P_2$, $P_3$, $P_4$. However, the location of the starting point $P_3$ which belongs to a normalized starting rotational position of the reflector prism 60 (preferably, with a horizontally lying roof edge, i.e., intersection line of the rectangles spanned by the legs) is important.

In another configuration of the invention, it is provided that not only one pivoting motion of the reflector prism 60 together with the pertinent recording of position data of light points on an assigned sensor be carried out, but subsequently, optionally, also beforehand, a rotary or pivoting motion of the light transmitting and receiving device be carried out for the reflector prism 60 which is now stationary. This can be done either in, for example, three preferred rotational locations which relate to a vertical line, or take place in three or more arbitrarily adjustable rotational positions of the light sending and receiving device. Here, it is also advantageous to detect the angular position of these rotational locations by means of an electronically acting inclinometer and to have them be incorporated into the entire electronic computation operation of measurement value acquisition and display in accordance with the invention. The latter named embodiment of the invention is therefore linked remotely to the teaching of German Patent Application DE 10109462.0 and corresponding U.S. Pat. No. 6,609,305.

Figure 3:
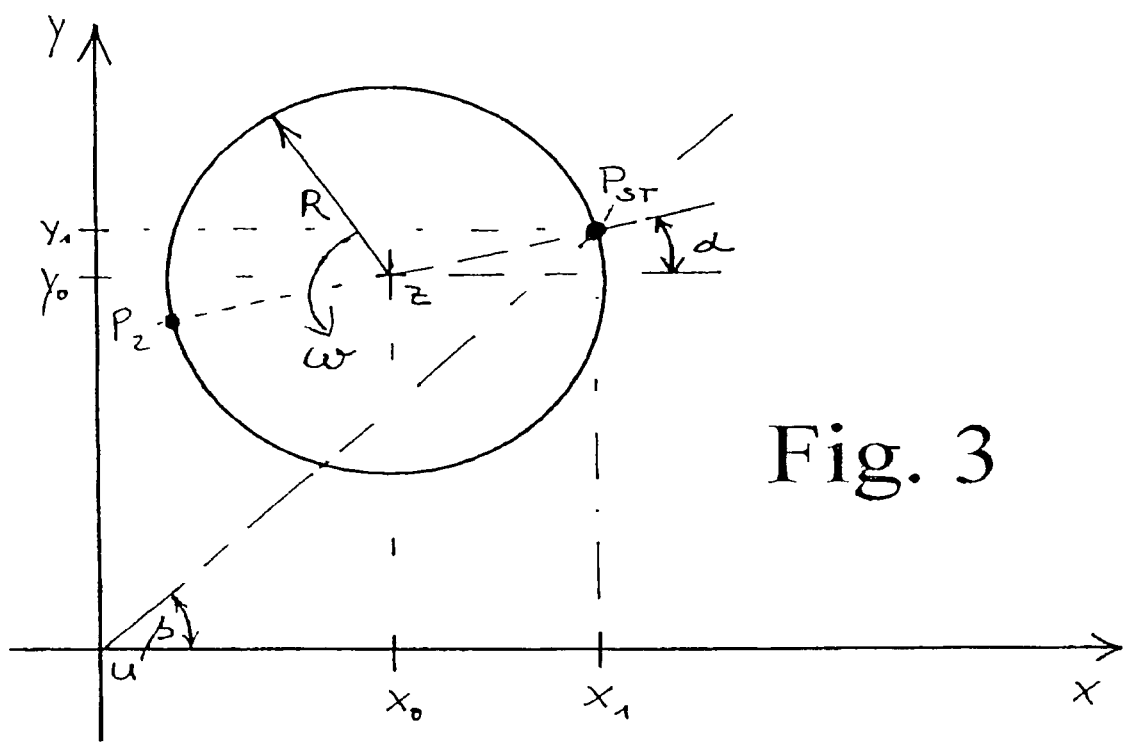
FIG. 3 illustrates an alternative method for obtaining the required measurement data.

It is shown in FIG. 3 how the required measurement data can be made available differently. For example, the incidence points of the light beam 46 at point $P_{st}$ and $P_2$ can be determined, $P_{st}$ resulting from a predefined starting rotary location of the reflector prism and $P_2$ from the pertinent rotary location of the reflector prism which differs by 90° from this predefined starting rotational position. The coordinates of point Z can then obviously be determined as average values of the x coordinates and y coordinates of points $P_{st}$ and $P_2$, if the aforementioned "further computation operation" is not based anyway on such diametrically arranged point coordinates or values which have been derived or can be derived and which belong to them (compare angular value "β" between the ordinate and straight line through the origin and $P_{st}$).

FIG. 3 shows that the circle formed by points $P_{st}$ and $P_2$ has a radius R. The symbol "ω" indicates that the rotational speed of a light spot revolving on the corresponding circle is twice the rotational speed which the reflector prism executes.

The described device and the associated measurement process can be used for a plurality of alignment measures in an industrial and architectonic environment, especially to calibrate cylindrical or hollow-cylindrical articles relative to one another in a flush manner.

The invention claimed is:

1. Device for alignment of objects, comprising:
   light transmitting and receiving device having means for attachment thereof within a first hollow object and with which a first reference axis is defined parallel to a longitudinal axis of the first hollow object,
   a reflector prism having means for mounting the reflector prism within a second hollow object on a second reference axis which is parallel to a longitudinal axis of the second hollow object;
   means for rotating one of the reflector prism and the light transmitting and receiving device relative to the other of the light transmitting and receiving device and the reflector prism about the respective one of the first and second reference axes;
   wherein said light transmitting and receiving device has means for directing a light beam along said first reference axis to said reflector prism and a sensor for receiving a portion of said light beam reflected back toward the light transmitting and receiving device by said reflector prism in a plurality of positions of rotation of the reflector prism relative to said light transmitting and receiving device.

2. Device for alignment of machines or objects according to claim 1, wherein said light transmitting and receiving device is fixable and said reflector prism is rotatable by said means for rotating.

3. Device for alignment of machines or objects according to claim 1, wherein said light transmitting and receiving device is rotatable around its lengthwise axis by said means for rotating and said reflector prism is fixable.

4. Device for alignment of objects according to claim 1, wherein the objects are each one of pipe and hollow cylinder.

5. Device for alignment of objects according to claim 2, further comprising an inclinometer mounted on a holder for the reflector prism and with which the rotational position of the reflector prism is determinable.

6. Process for alignment of objects with respect to each other, comprising the steps of:

using a light transmitting and receiving device to define a first reference axis of a first object, attaching a reflector prism to a second object and rotating the reflector prism around a second reference axis while transmitting a light beam from said light transmitting and receiving device along said first reference axis toward said reflector prism, using a sensor to detect coordinates of a location at which a portion of the transmitted light beam reflected by said reflector prism has impinged, and determining the position of the first reference axis relative to the location of the second reference axis based upon two angular coordinates of space and based upon two parallel offset coordinates.

7. Process according to claim 6, comprising the further step of bringing a first object into a predetermined alignment with a second object based upon relative positions of the objects determined from said angular coordinates and said parallel offset coordinates.

8. Process according to claim 7, wherein each of the objects brought into alignment relative to one another are one of a machine, a machine element, a pipe and a hollow cylinder.

9. Process according to claim 8, wherein the rotating of the reflector prism is performed with the position of the light transmitting and receiving device fixed, sensor readings being taken in at least 3 rotational positions of the reflector prism, and comprising the additional step of rotating the light transmitting and receiving device with the position of the reflector prism fixed, sensor readings being taken in at least 3 rotational positions of the light transmitting and receiving device.

10. Process according to claim 6, wherein the rotating of the reflector prism is performed with the position of the light transmitting and receiving device fixed, sensor readings being taken in at least 3 rotational positions of the reflector prism, and comprising the additional step of rotating the light transmitting and receiving device with the position of the reflector prism fixed, sensor readings being taken in at least 3 rotational positions of the light transmitting and receiving device.

11. Process according to claim 9, comprising the further step bringing one object into a predetermined alignment with another object based upon relative positions of the objects relative to said first and second reference axes.

12. for alignment of objects according to claim 1, further comprising a beam splitter that is mountable in the first hollow object between the light transmitting and receiving device and the reflector prism for deflecting the portion of said light beam reflected back toward the light transmitting and receiving device to said sensor.

* * * * *